(12) United States Patent  (10) Patent No.: US 7,509,853 B2
Noe  (45) Date of Patent: Mar. 31, 2009

(54) RUNOFF RAIN GAUGE ELEVATED IN SITU DESIGN

(76) Inventor: Stephen A. Noe, 12603 Hammersmith Dr., Tomball, TX (US) 77377

(*) Notice: Subject to any disclaimer, the term of this patent is extended or adjusted under 35 U.S.C. 154(b) by 0 days.

(21) Appl. No.: 11/837,512

(22) Filed: Aug. 11, 2007

(65) Prior Publication Data

US 2008/0060429 A1 Mar. 13, 2008

Related U.S. Application Data

(60) Provisional application No. 60/822,242, filed on Aug. 13, 2006.

(51) Int. Cl.
*G01W 1/00* (2006.01)
(52) U.S. Cl. .......................... 73/170.17; 73/86
(58) Field of Classification Search ............... 73/170.17, 73/86
See application file for complete search history.

(56) References Cited

U.S. PATENT DOCUMENTS

| | | | |
|---|---|---|---|
| 2,697,286 A | 12/1954 | Miller | |
| 2,923,148 A | 2/1960 | Kirkham et al. | |
| 5,279,151 A | 1/1994 | Coody et al. | |
| 5,323,317 A | 6/1994 | Hampton et al. | |
| 5,463,909 A | 11/1995 | Eldridge | |
| 5,531,114 A | 7/1996 | Frager | |
| 5,594,185 A | 1/1997 | Winberry et al. | |
| 6,105,418 A | 8/2000 | Kring | |
| 6,702,517 B2 | 3/2004 | Goddard | |
| 7,066,021 B1 | 6/2006 | Noe | |
| 2003/0071737 A1 | 4/2003 | Nawathe | |
| 2006/0191333 A1 | 8/2006 | Noe | |

*Primary Examiner*—Andre J Allen
(74) *Attorney, Agent, or Firm*—Daniel N. Lundeen; Lundeen & Lundeen, PLLC

(57) ABSTRACT

Disclosed is an in situ design for a runoff rain gauge 14 comprising an elevated storage pan 18 for storing precipitation above grade, a splitter pan 28 for partitioning the split of flow from storage to runoff and infiltration, a saturation cup 40 for measuring surface saturation of the infiltration resistance medium and a saturation cap 42 and splitter balance line 38 for communicating water levels in the saturation cup 40 to the splitter pan 28.

23 Claims, 3 Drawing Sheets

RUNOFF RAIN GAUGE ELEVATED IN SITU DESIGN

CROSS REFERENCE TO RELATED APPLICATION

This application claims the benefit of provisional application U.S. Ser. No. 60/822,242, filed Aug. 13, 2006.

BACKGROUND OF INVENTION

This invention relates to a runoff rain gauge, and more particularly to a rain gauge that can provide an estimate of the rainfall split between soil infiltration and runoff.

Runoff rain gauges are known from applicant's earlier U.S. Pat. No. 7,066,021 and US 20060191333 which are hereby incorporated herein by reference. These runoff rain gauges may require extraction of a core soil sample from the ground, which can introduce inaccuracy in some conditions by disturbing the original conditions of the soil infiltration sample.

Earlier runoff rain gauge designs for a runoff rain gauge stored collected precipitation directly on top of the core sample. Some of the stored water typically infiltrated into the core sample. The remainder flowed via gravity through the runoff circuit to a runoff-measuring device. For the prior in situ design, this may require mounting the runoff-measuring device below grade to allow for gravity flow. However, a self-draining gauge mounted below grade cannot discharge to grade without the use of a pump, which made the use of an electronic gauge for the in situ format problematic. There is a need in the art for a design that can combine the advantages of the in situ format with the convenience of a self-draining gauge for measuring runoff.

SUMMARY OF INVENTION

The present invention can measure both the quantity and quality of rainfall by approximating the amount of runoff, thereby providing an estimate for the rainfall infiltration into the soil as the difference between the measured rainfall and runoff. The gauges for measuring total precipitation and runoff can be simple collectors or self-draining electronic designs. To accommodate a self-draining gauge for measuring runoff, precipitation storage can be elevated above grade, which can allow the gauge measuring runoff to also be elevated above grade, providing for free drainage from the measuring device to grade via gravity flow.

In one embodiment, the invention provides a rain runoff gauge for measuring precipitation, soil runoff with respect to a reference soil and soil infiltration by difference. The gauge can include a collector tube having an opening to receive precipitation. A storage circuit can be in communication with the collector tube to provide infiltration and surface runoff characteristics of the reference soil, and a splitter circuit in communication with the collector tube to provide infiltration resistance of the reference soil. The gauge can also include a runoff line from the splitter circuit, and a runoff-measuring device to measure runoff from the runoff line.

In an embodiment, the collector tube can provide precipitation storage elevated above grade. The runoff- measuring device can include a runoff gauge elevated above grade with free drainage to grade via gravity flow. The splitter circuit can include a sample from the reference soil. In one embodiment, evaporation ports in the collector tube can allow wind and sunlight to pass across a surface of the sample. A transparent hood can be disposed to pass sunlight to the evaporation ports and to exclude rainfall from entering the evaporation ports and the runoff-measuring device.

In one embodiment, the storage circuit can include a storage pan, a storage seal leg in an outflow circuit from the storage pan, and a storage drip tube to form an air backflow seal between the storage pan and the storage seal leg. An outlet zone of the storage drip tube can be hydraulically connected to a storage balance line between the outlet zone and a ground surface. A ground connector can be attached to the storage balance line. The ground connector can include a base plate anchored in contact with the ground surface and a seal cap with a bottom lip disposed horizontally outwardly beyond a footprint of the base plate.

In another embodiment, the splitter circuit can include a splitter pan, a splitter seal leg hydraulically connected to the splitter pan via an infiltration line, and a splitter drip tube to form an air backflow seal between the splitter pan and the infiltration line. An outlet zone of the splitter drip tube can be hydraulically connected to a splitter balance line between the outlet zone and a surface of a core sample. A ground connector can be attached to the splitter balance line. The ground connector can include a perforated saturation cup embedded in the surface of the core and a saturation cap disposed in the saturation cup.

In one embodiment, the rain runoff gauge can include a side-mounted external saturation wall cap operatively associated with the saturation cup and cap, wherein the saturation wall cap comprises a perforated wall coincident with an inner surface of the collector tube to convey water while retaining soil. An internal baffle with a bottom opening can partition an air compartment in the saturation wall cap that becomes sealed as the water level rises. The splitter balance line can attach to a top of the air compartment and convey pressure in the compartment to the outlet zone of the splitter drip tube. This embodiment can allow the surface of the core sample to remain undisturbed.

In another embodiment, the rain runoff gauge can include a bottom unit portion containing a core sample separated from a main unit to provide a top of the core sample with a full diameter window for wind and sunlight. The split design also provides flexibility for mounting the main unit and gauges at higher elevation for more convenient access. The splitter drip tube can be hydraulically connected to introduce water into the splitter seal leg. The splitter seal leg can be pressurized by the splitter balance line to control flow from the splitter drip tube. The splitter seal leg can drip water into an infiltration sump to convey water to the core sample via an infiltration tube. In an embodiment, a first transparent hood can be disposed to pass sunlight to and exclude rainfall from entering the core sample. A second hood can exclude rainfall from entering the runoff-measuring device.

In an alternate embodiment, the splitter pan can have a tubular arrangement including a vertical tube with a top funnel to collect and convey water from the storage circuit to a horizontal tube containing the splitter drip tube. The horizontal tube can convey water via the splitter drip tube to the infiltration line. The runoff line can include a vertical section extending upwards into the vertical tube, and an inlet hat to inhibit water exiting the storage circuit from directly entering the runoff line. The small diameter of the tubing in the tubular embodiment can reduce the volume of water stored in the unit between the infiltration and runoff levels.

In another embodiment, the present invention provides a method for measuring precipitation, soil runoff and soil infiltration by difference. The method can include: (1) mounting a collector tube that has an outer shell of a rain runoff gauge, by inserting a lower end thereof into the ground; (2) collecting precipitation in a top of the collector tube and storing the precipitation on top of a storage pan; (3) passing a flow from the storage pan through a storage drip tube, wherein the storage drip tube is sufficiently small to provide self-sealing via capillary forces; (4) allowing a water level on the storage pan to track a ground water level during a rain event via a first backpressure circuit connecting the storage pan to the ground, whereby a rising ground water level pressurizes air underneath a seal cap, thereby pressurizing air in an inlet zone of a storage seal leg via a storage balance line to resist flow from the storage drip tube and allow the water level on the storage pan to rise; (5) dripping water from the storage seal leg onto a splitter pan disposed below the storage pan, wherein the splitter pan includes a self-sealing drip tube for passing water from the splitter pan to a core soil sample below, and a runoff line for passing water to a runoff measuring device, to thereby partition the water from the splitter pan into infiltration and runoff, wherein the splitter drip tube is mounted adjacent and below the runoff line so water feeding the splitter pan preferentially passes through the drip tube to an infiltration line and splitter seal leg; and (6) providing a second backpressure circuit connecting the splitter pan to a top of the core soil sample to allow a water level on the splitter pan to track saturation of the core soil sample during a rain event.

In an embodiment of the method, the core soil sample can absorb water from the splitter seal leg, directing excess rainfall from storage to the splitter pan only to the core sample. The method can include causing the water level on the splitter pan to rise when the core soil sample approaches saturation and the water level in the saturation cup tends to rise, whereby the rising water level pressurizes air underneath a saturation cap to thereby pressurize the infiltration line and splitter seal leg inlet via a splitter balance line and resist flow from the splitter drip tube.

In an embodiment, the method can also include mounting the splitter seal leg so an outlet therefrom discharges to one side of the core soil sample, and mounting a saturation cup and cap on an opposite side thereof, whereby backpressure is conveyed to the splitter drip tube only when a surface of the core soil sample approaches full saturation. This embodiment can help insure that the full core surface approaches saturation before backpressure is conveyed to the splitter drip tube.

Further, an embodiment can include coordinating a spacing between elevations of the splitter drip tube and runoff line with a below-grade sealing depth of the saturation cap in the saturation cup, whereby as the water level in the saturation cup approaches grade, the water level on the splitter pan reaches the runoff line elevation and runoff commences, and whereby the circuit provides the infiltration requirements of the core during runoff as determined by the water level in the saturation cup. In another embodiment, wind and sunlight are allowed to pass across a surface of the core soil sample, whereby normal evaporation is facilitated between rain events. In one embodiment sunlight passes through a transparent hood wherein the hood excludes rainfall from the evaporation ports and runoff measuring device.

DETAILED DESCRIPTION

The present invention provides an in situ precipitation measuring device capable of simultaneously measuring rainfall and soil runoff during a rain event. Soil infiltration can thereby be determined by difference. The gauges for measuring total precipitation and runoff can be simple collectors or self-draining electronic designs.

Figure 1:
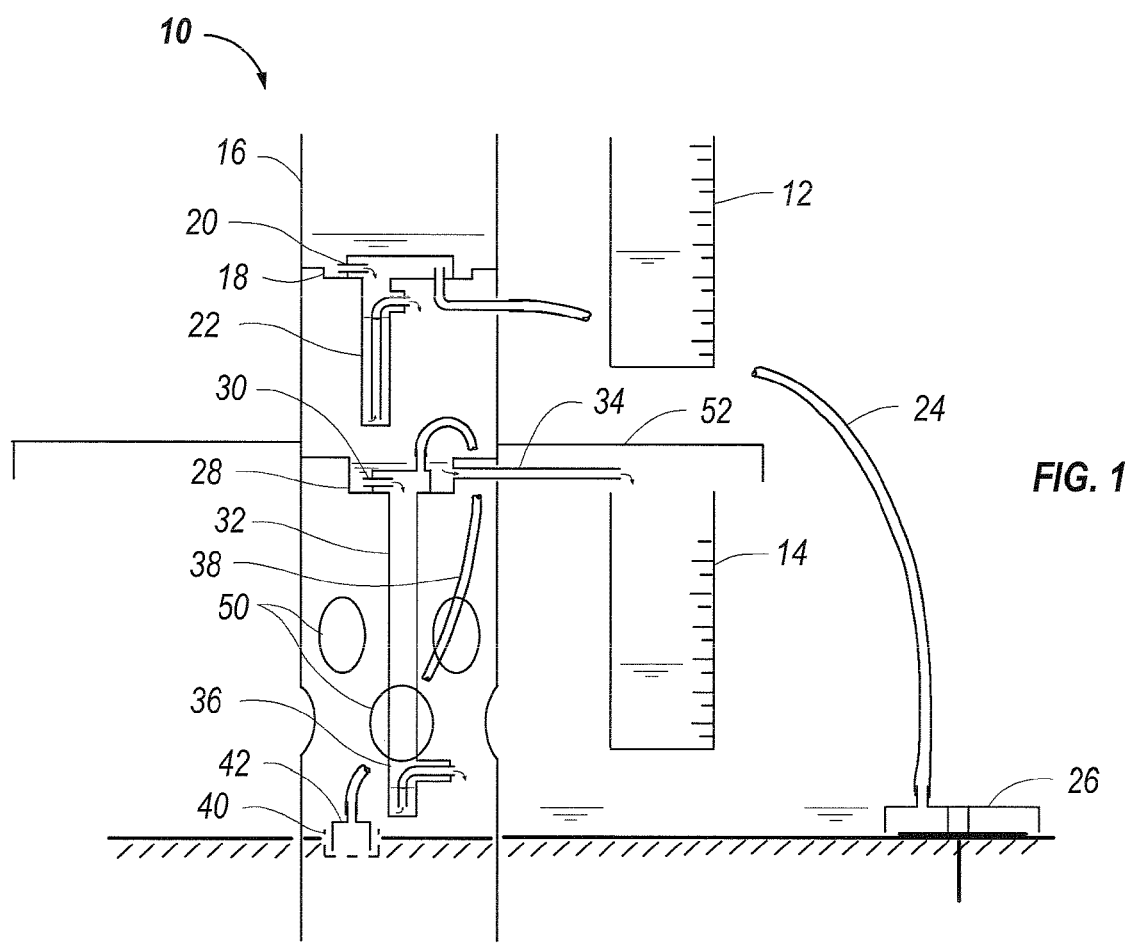
FIG. 1 is an overall schematic drawing of the principal components of an elevated in situ design for a runoff rain gauge in accordance with one embodiment of the present invention.

FIG. 1 illustrates one principal embodiment of the rainfall measuring instrument 10. The device can include a standard rain gauge 12, preferably including graduated markings for determination of rainfall amounts, and an above-grade gauge measuring runoff 14, preferably including graduated markings for determination of runoff amounts. The instrument 10 can also include a collector tube 16, which can include an above-grade storage pan 18. The collector tube 16 which comprises the outer shell of the design can be vertically mounted by inserting the lower end into the ground. The storage pan 18 is preferably located near the upper end of the collector tube 16 and precipitation that is collected at the top of the collector tube 16 can be stored on top the storage pan 18. Flow from the storage pan 18 passes through a storage drip tube 20, which is sufficiently small to insure self-sealing via capillary forces.

The storage drip tube 20 can direct precipitation from the storage pan 18 into a storage seal leg 22. The storage seal leg 22 can be pressurized by a storage balance line 24 connected to a seal cap 26 which is mounted on the ground, thereby creating a backpressure circuit between the storage pan 18 and the ground for controlling drainage from the storage pan 18. A rising level of ground water pressurizes air beneath the seal cap 26, thereby pressurizing the air in the inlet zone of the storage seal leg 22 via the storage balance line 24. The increasing pressure in the storage seal leg 22 can hinder flow from the storage drip tube 20, thereby permitting the precipitation level on the storage pan 18 to rise.

To accommodate a self-draining gauge for measuring runoff, precipitation storage in the collector tube 16 can be elevated above grade. This allows the runoff measuring gauge 14 to also be elevated above grade, providing for free drainage from the measuring device to grade via gravity flow. The design can thereby circumvent water storage at grade level, which cannot otherwise be passed to runoff without a below-grade mounting for the runoff measuring gauge 14.

The ground water level is determined by local rainfall quantity, soil infiltration and net runoff. Since no loss to infiltration or runoff are experienced on top the storage pan 18, the water level on top the storage 15 pan 18 will tend to rise faster than the ground water level. The backpressure circuit created by the storage seal leg 22, the storage drip tube 18, the storage balance line 24 and the seal cap 26 can continuously compare the water height on the storage pan 18 to the ground water height, preferably passing any excess head through the outlet of the 20 storage seal leg 22 as the combined runoff plus infiltration.

Water from the storage seal leg 22 can drip onto the splitter pan 28, preferably located directly below the storage pan 18. The splitter pan 28 can partition the excess flow from storage into infiltration and runoff. The splitter pan 28 can include a self-sealing capillary drip tube 30 for the purpose of directing water from the splitter pan to the core soil sample below within the collector tube 16, and a runoff line 34 for directing water to the runoff measuring device 14. The splitter drip tube 30 is preferably mounted slightly below the runoff line, thereby causing the water feeding the splitter pan 28 to preferentially pass through the splitter drip tube 30 to an infiltration line 32.

The infiltration line 32 extends downwards past the evaporation ports 50 into a splitter seal leg 36, wherein the outlet of the splitter seal leg preferably drips to one side of the core soil sample, and a perforated saturation cup 40 is positioned on the other side of the drip. This arrangement insures the surface of the core sample is fully saturated before the water level in the saturation cup 40 begins to rise. Preferably, the infiltration line 32 and splitter seal leg 36 are pressurized by a splitter balance line 38 connected to the saturation cap 42 which is mounted in the saturation cup 40, thereby creating a backpressure circuit between the splitter pan 28 and the core sample for controlling flow from the splitter pan 28 to the core surface. The saturation cup 40 can be lightly embedded in the surface of the core soil sample.

The backpressure circuit for the splitter pan 28 can provide a function that is analogous to the backpressure circuit for the storage pan 18. So long as the core sample can absorb water from the splitter seal leg 36, the water level in the saturation cup 40 will be minimal and any excess rainfall passed from storage to the splitter pan 28 can be directed to the core soil sample within the collector tube 16. As the core soil sample approaches saturation, however, the water level in the saturation cup 40 will tend to rise, thereby pressurizing the air beneath the saturation cap 42 and placing a backpressure on the splitter drip tube 30 via the splitter balance line 38, causing the water level on the splitter pan 28 to rise.

The spacing in elevation between the splitter drip tube 30 and the runoff line 34 preferably coordinates with the below-grade sealing depth of the saturation cap 42 in the saturation cup 40. As the water level in the saturation cup 40 approaches grade, the water level on the splitter pan 28 can rise to the elevation of the runoff line 34, when runoff can commence. The runoff line 34 is preferably of high capacity so only a minimal head will be required for even the heaviest rainfall rates. This insures the level in the saturation cup 40 will not rise above grade. From another perspective, should the level in the saturation cup 40 rise to grade, the backpressure developed is greater than the available head that can be developed on the splitter pan 28; thereby flow through the splitter drip tube 30 is suppressed before ponding occurs on the surface of the core sample. The circuit continuously provides for the infiltration requirements of the core soil sample during runoff, as determined by the water level in the saturation cup 40.

The storage pan and storage backpressure circuit carefully control the water stored in the unit so that the time available for the core to absorb water during a rain event tracks that of the surrounding area. By contrast, the splitter pan and splitter backpressure circuit can function as a simple hydraulic switch. To maximize the responsiveness of the switch, it is desirable to minimize the amount of water needed in the splitter pan to prime and toggle the switch between the full infiltration and runoff modes.

Figure 2:
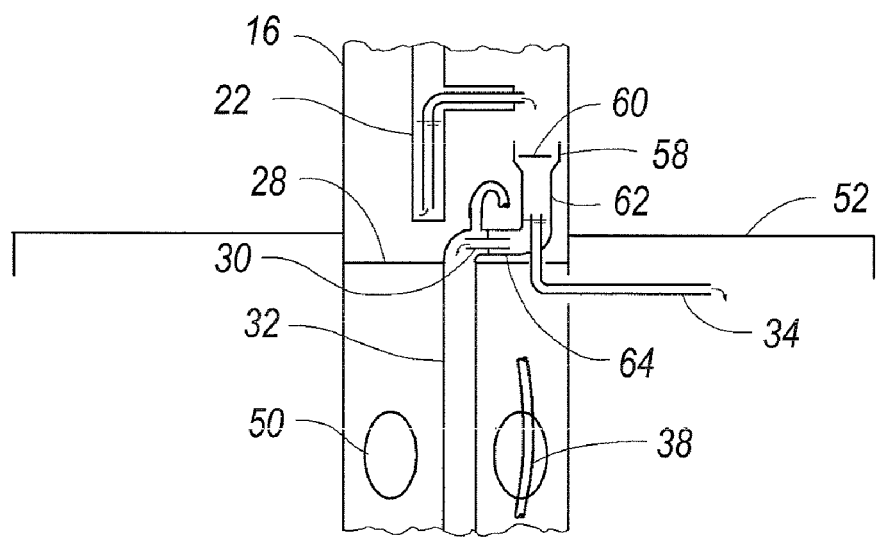
FIG. 2 is a schematic drawing of a tubular splitter pan design as an alternate to the splitter pan in the gauge of FIG. 1 according to another embodiment of the invention.

FIG. 2 illustrates an embodiment of the invention wherein the splitter pan comprises a tubular arrangement. The small diameter of the tubing can help minimize the volume of water stored in the unit between the infiltration and runoff levels. A vertical tube 62 with top funnel 58 can collect water from the storage seal leg 22 and convey it to a horizontal tube 64 containing the splitter drip tube 30. The horizontal tube 64 can convey water via the splitter drip tube 30 to the infiltration line 32. The runoff line 34 can include a vertical section extending upwards into the vertical tube 62. A runoff line inlet hat 60 prevents water exiting the storage seal leg 22 from directly entering the runoff line 34.

The water level on the splitter pan 28 during infiltration only is set by the elevation of the splitter drip tube 30, while the water level with runoff occurring is set by the top end of the runoff line 34. During infiltration only, the water level floats at a level slightly above that of the splitter drip tube 30. As backpressure builds, the level begins to rise into the vertical tube 62 and eventually reaches the top end of the runoff line 34, where overflow occurs. Both the splitter drip tube 30 and runoff line 34 can have sufficient capacity to insure minimal head is required for pressure drop at heavy rainfall rates. The liquid level is therefore fully regulated by the splitter backpressure circuit.

Figure 3:
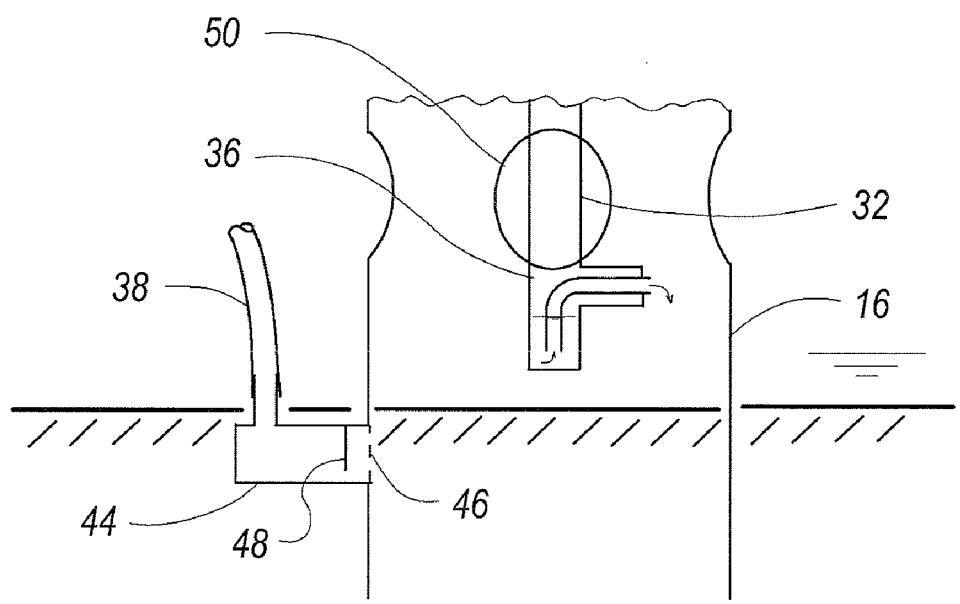
FIG. 3 is a schematic drawing of a side-mounted saturation wall cap as an alternate sensor design to the splitter circuit saturation cup and cap in the gauge of FIG. 1 according to another embodiment of the invention.

FIG. 3 illustrates another embodiment of the invention wherein the function of sensing core saturation provided by the saturation cup 40 and saturation cap 42 can alternately be provided by a side-mounted external saturation wall cap 44. The saturation wall cap 44 can feature a perforated wall 46 coincident with the inner surface of the collector tube 16 for conveying water while retaining the soil. As the soil becomes saturated, water can freely flow through perforated wall 46 into the sensor. An internal baffle 48 with a bottom opening can partition off an air compartment in the wall cap 44 that becomes sealed as the water level rises. The splitter balance line 38 can attach to the top of the compartment and convey pressure to the outlet zone of the splitter drip tube 30. This sensor design can allow the surface of the core sample to remain undisturbed.

Preferably, evaporation ports 50, collectively, on the walls of collector tube 16, provide ample wind and sunlight to pass across the surface of the core soil sample, thereby insuring normal evaporation takes place between rain events. A transparent hood 52 can pass sunlight to the evaporation ports 50 while excluding rainfall from the ports 50 and gauge 14.

Figure 4:
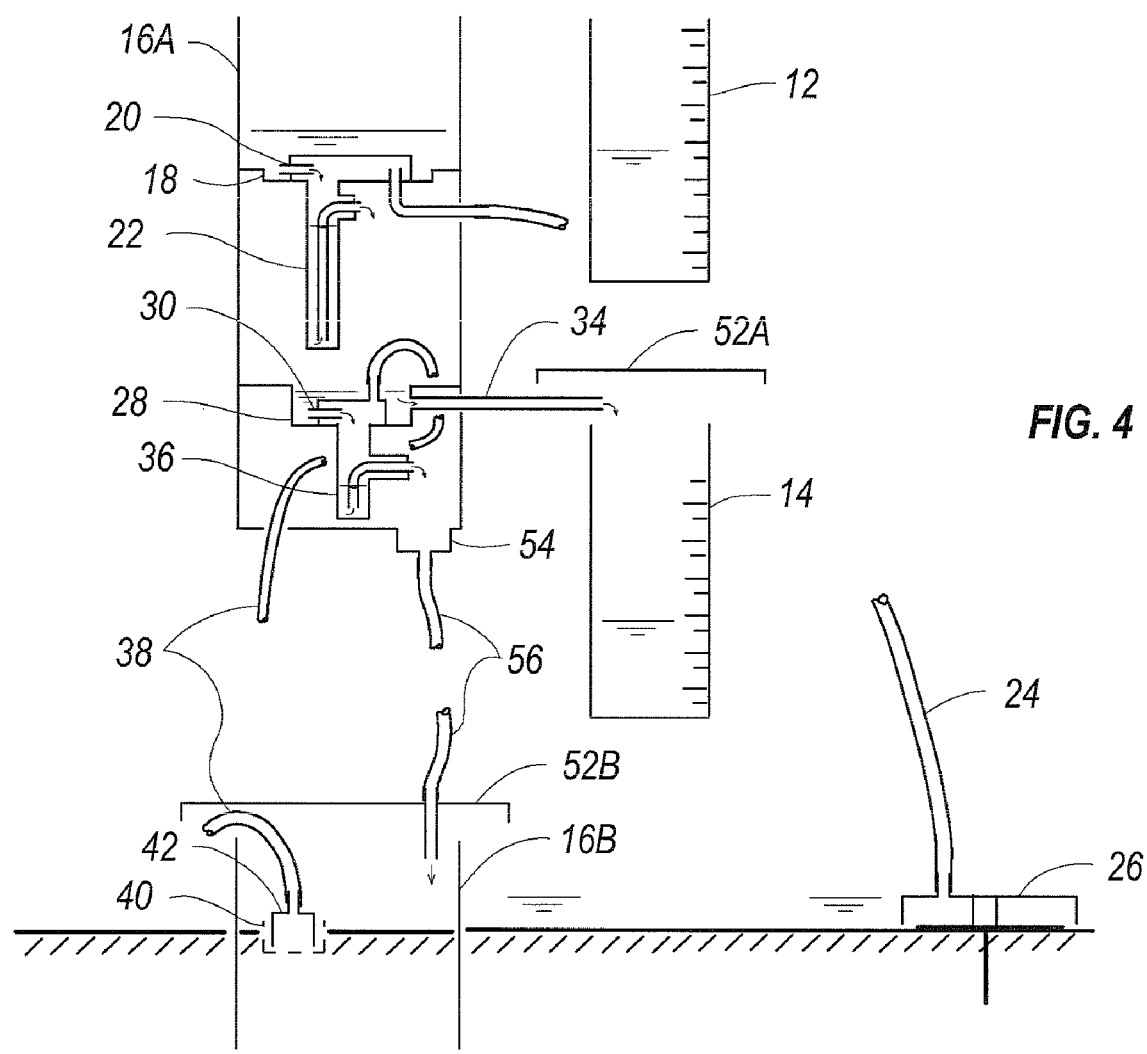
FIG. 4 is a schematic drawing of an alternate embodiment of the in situ design according to the invention in which the bottom of the unit is split off from the main unit.

Alternately, as shown in the embodiment of FIG. 4, the bottom of the unit containing the core sample may be split off from the main unit to provide a full diameter window for wind and sunlight. The split design can also provides flexibility for mounting the main unit at higher elevation for more convenient access.

In this embodiment, water from the splitter drip tube 30 can enter the splitter seal leg 36, which can be pressurized by the splitter balance line 38. The outlet of splitter seal leg 36 can drip into infiltration sump 54, which conveys water down to the core soil sample via infiltration tube 56. A transparent hood 52B can pass sunlight while excluding rainfall from the core window, while a gauge hood 52A can exclude rainfall from the gauge measuring runoff 14.

The circumvention of water storage on the surface of the core soil sample can exclude the effect of surface head on infiltration, thereby slightly reducing the infiltration rate. However, modeling indicates the resulting error in the measured split of runoff to infiltration can be negligible, because the surface head is typically trivial compared to the main components controlling infiltration, specifically the depth of the wetted front in the soil and the wetting front suction head of the soil.

The invention is described above in reference to specific examples and embodiments. The metes and bounds of the invention are not to be limited by the foregoing disclosure, which is illustrative only, but should be determined in accordance with the full scope and spirit of the appended claims.

What is claimed is:

1. A rain runoff gauge (10) for measuring precipitation, soil runoff with respect to a reference soil and soil infiltration by difference, comprising:
   a collector tube (16) having an opening to receive precipitation, wherein the collector tube (16) comprises precipitation storage elevated above grade;
   a storage circuit in communication with the collector tube (16) to provide infiltration and surface runoff characteristics of the reference soil;
   a splitter circuit in communication with the collector tube (16) to provide infiltration resistance of the reference soil;
   a runoff line (34) from the splitter circuit; and
   a runoff-measuring device (14) elevated above grade to measure runoff from the runoff line (34).

2. The rain runoff gauge (10) of claim 1, wherein the splitter circuit comprises a sample from the reference soil.

3. The rain runoff gauge (10) of claim 2, further comprising evaporation ports (50) in the collector tube (16) to allow wind and sunlight to pass across a surface of the sample.

4. The rain runoff gauge (10) of claim 3, further comprising a transparent hood (52) disposed to pass sunlight to the evaporation ports (50) and to exclude rainfall from entering the evaporation ports (50) and the runoff-measuring device (14).

5. The rain runoff gauge (10) of claim 1, wherein the storage circuit comprises a storage pan (18), a storage seal leg (22) in an outflow circuit from the storage pan (18) and a storage drip tube (20) to form an air backflow seal between the storage pan (18) and the storage seal leg (22).

6. The rain runoff gauge (10) of claim 5, wherein an outlet zone of the storage drip tube (20) is hydraulically connected to a storage balance line (24) between the outlet zone and a ground surface.

7. The rain runoff gauge (10) of claim 6, further comprising a ground connector attached to the storage balance line (24).

8. The rain runoff gauge (10) of claim 7, wherein the ground connector comprises a base plate anchored in contact with the ground surface and a seal cap (26) with a bottom lip disposed horizontally outwardly beyond a footprint of the base plate.

9. The rain runoff gauge (10) of claim 1, wherein the splitter circuit comprises a splitter pan (28), a splitter seal leg (36) hydraulically connected to the splitter pan (28) via an infiltration line (32), and a splitter drip tube (30) to form an air backflow seal between the splitter pan (28) and the infiltration line (32).

10. The rain runoff gauge (10) of claim 9, wherein an outlet zone of the splitter drip tube (30) is hydraulically connected to a splitter balance line (38) between the outlet zone and a surface of a core sample.

11. The rain runoff gauge (10) of claim 10, further comprising a ground connector attached to the splitter balance line (38).

12. The rain runoff gauge of claim 11, wherein the ground connector comprises a perforated saturation cup (40) embedded in the surface of the core and a saturation cap (42) disposed in the saturation cup (40).

13. The rain runoff gauge (10) of claim 11, further comprising:
   a side-mounted external saturation wall cap (44) operatively associated with the saturation cup (40) and cap (42), wherein the saturation wall cap (44) comprises a perforated wall (46) coincident with an inner surface of the collector tube (16) to convey water while retaining soil, and an internal baffle (48) with a bottom opening that partitions an air compartment in the saturation wall cap (44) that becomes sealed as the water level rises;
   wherein the splitter balance line (38) attaches to a top of the air compartment and conveys pressure in the compartment to the outlet zone of the splitter drip tube (30).

14. The rain runoff gauge (10) of claim 12, further comprising:
   a bottom unit portion (16B) containing a core sample separated from a main unit (16A) to provide a top of the core sample with a full diameter window for wind and sunlight;
   wherein the splitter drip tube (30) is hydraulically connected to introduce water into the splitter seal leg (36);
   wherein the splitter seal leg (36) is pressurized by the splitter balance line (38) to control flow from the splitter drip tube (30);
   wherein the splitter seal leg (36) drips water into an infiltration sump (54) to convey water to the core sample via an infiltration tube (56).

15. The rain runoff gauge of claim 14, further comprising:
   a first transparent hood (52B) disposed to pass sunlight to and exclude rainfall from entering the core sample; and
   a second hood (52A) to exclude rainfall from entering the runoff-measuring device (14).

16. The rain runoff gauge (10) of claim 9, wherein the splitter pan (28) comprises a tubular arrangement comprising a vertical tube (62) with a top funnel (58) to collect and convey water from the storage circuit to a horizontal tube (64) containing the splitter drip tube (30), wherein the horizontal tube (64) conveys water via the splitter drip tube (30) to the infiltration line (32), and wherein the runoff line (34) includes a vertical section extending upwards into the vertical tube (62) and an inlet hat (60) to inhibit water exiting the storage circuit from directly entering the runoff line (34).

17. The rain runoff gauge (10) of claim 1, wherein the runoff-measuring device (14) comprises a runoff gauge elevated above grade with free drainage to grade via gravity flow.

18. A method for measuring precipitation, soil runoff and soil infiltration by difference, comprising:
   mounting a collector tube (16) comprising an outer shell of a rain runoff gauge (10) by inserting a lower end thereof into the ground;
   collecting precipitation in a top of the collector tube (16) and storing the precipitation on top of a storage pan (18);
   passing a flow from the storage pan (18) through a storage drip tube (20), wherein the storage drip tube (20) is self-sealing via capillary forces;
   allowing a water level on the storage pan (18) to track a ground water level during a rain event via a first back-pressure circuit connecting the storage pan (18) to the ground, whereby a rising ground water level pressurizes air underneath a seal cap (26), thereby pressurizing air in an inlet zone of a storage seal leg (22) via a storage balance line (24) to resist flow from the storage drip tube (20) and allow the water level on the storage pan (18) to rise;
   dripping water from the storage seal leg (22) into a splitter pan (28) disposed below the storage pan (18), wherein the splitter pan (28) includes a self-sealing drip tube (30) for passing water from the splitter pan (28) to a core soil sample below, and a runoff line (34) for passing water to a runoff measuring device (14), to thereby partition the water from the splitter pan (28) into infiltration and runoff, wherein the splitter drip tube (30) is mounted adjacent and below the runoff line (34) so water feeding the splitter pan (28) preferentially passes through the drip tube (30) to an infiltration line (32) and splitter seal leg (36);

providing a second backpressure circuit connecting the splitter pan (28) to a top of the core soil sample to allow a water level in the splitter pan (28) to track saturation of the core soil sample during a rain event.

19. The method of claim 18, further comprising:

when the core soil sample can absorb water from the splitter seal leg (36), directing excess rainfall from storage to the splitter pan (28) essentially only to the core sample; and causing the water level on the splitter pan (28) to rise when the core soil sample approaches saturation and the water level in the saturation cup (40) tends to rise, whereby the rising water level pressurizes air underneath a saturation cap (42) to thereby pressurize the infiltration line (32) and splitter seal leg (36) inlet via a splitter balance line (38) and resist flow from the splitter drip tube (30).

20. The method of claim 19, further comprising mounting the splitter seal leg (36) so an outlet therefrom discharges to one side of the core coil sample, and mounting a saturation cup (40) and cap (42) on an opposite side thereof, whereby backpressure is conveyed to the splitter drip tube (30) essentially only when a surface of the core soil sample approaches fall saturation.

21. The method of claim 20, further comprising coordinating a spacing between elevations of the splitter drip tube (30) and runoff line (34) with a below-grade sealing depth of the saturation cap (42) in the saturation cup (40), whereby as the water level in the saturation cup (40) approaches grade, the water level on the splitter pan (28) reaches the runoff line (34) elevation and runoff commences, and whereby the circuit provides the infiltration requirements of the core during runoff as determined by the water level in the saturation cup (40).

22. The method of claim 21, further comprising allowing wind and sunlight to pass across a surface of the core soil sample, whereby normal evaporation is facilitated between rain events.

23. The method of claim 22, further comprising passing sunlight through a transparent hood (52) wherein the hood excludes rainfall from the evaporation ports (50) and runoff measuring device (14).

* * * * *